United States Patent [19]
Enstrom

[11] 3,882,755
[45] May 13, 1975

[54] SHEET METAL DRIVE FASTENER
[75] Inventor: Robert Victor Enstrom, Oak Park, Ill.
[73] Assignee: Illinois Tool Works Inc., Chicago, Ill.
[22] Filed: Nov. 15, 1973
[21] Appl. No.: 416,302

[52] U.S. Cl.............. 85/11; 24/73 B; 85/28; 85/21
[51] Int. Cl............................................ F16b 15/06
[58] Field of Search ............ 85/21, 11, 5 R, 80, 23, 85/28; 24/213 B, 73 B, 73 MF

[56] References Cited
UNITED STATES PATENTS

| 429,118 | 6/1890 | Durell | 85/5 R |
|---|---|---|---|
| 2,110,959 | 3/1938 | Lombard | 85/5 R |
| 2,180,925 | 11/1939 | Dyresen | 24/73 MF |
| 2,246,720 | 6/1941 | Churchill | 24/213 B |
| 2,319,058 | 5/1943 | Hansman | 85/5 R |
| 2,353,579 | 7/1944 | Miller | 85/11 |
| 2,392,179 | 1/1946 | Paley et al. | 85/23 |
| 2,740,505 | 4/1956 | Flora | 85/11 |
| 3,511,127 | 5/1970 | Gisondi | 85/11 |
| 3,645,163 | 2/1972 | Byland | 85/21 |
| 3,775,927 | 12/1973 | Meyer | 85/5 R |

FOREIGN PATENTS OR APPLICATIONS
1,477,535  3/1967  France .................. 24/73 B Primary Examiner—Marion Parsons, Jr.
Attorney, Agent, or Firm—Robert W. Beart; Thomas W. Buckman

[57] ABSTRACT

A sheet metal drive fastener for penetrating roofing insulation and the like and puncturing sheet steel of other sheet metal decking and interlocking with the decking for securing the insulation thereto; and including an arcuate shank having a pointed end portion for puncturing an arcuate slot or aperture in the decking, and elongate wing-like arms trailing from the pointed end portion and initially diverging from the shank to be compressed upon passing through the punctured arcuate aperture in the decking against strong resistance into adjacency or contact with the edges of the shank and against lesser resistance in a compressive movement in a path generally radial to the imaginary center axis of the curved surface of the shank, and with the outer edges of the arms serrated to present barbs for locking engagement with the rear surface of the decking under the stored reactive spring force of the arms in their compressed condition.

5 Claims, 6 Drawing Figures

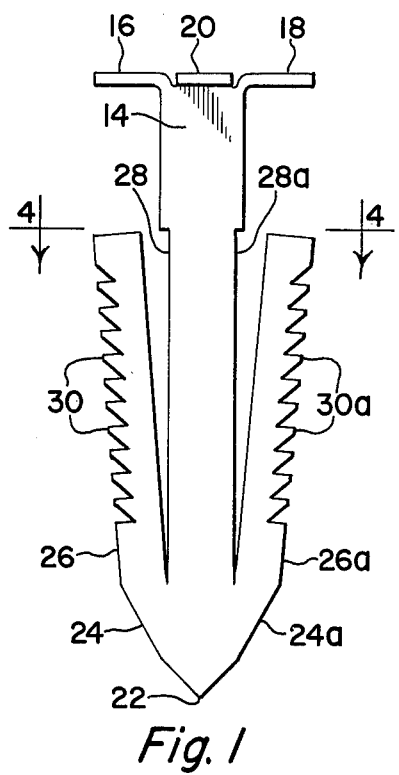
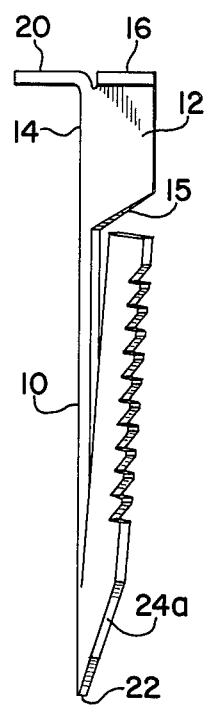
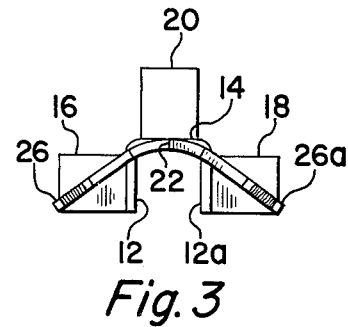
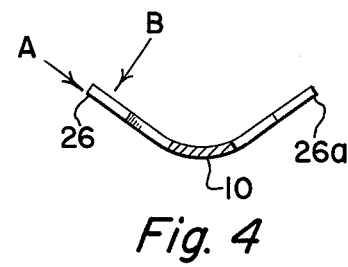
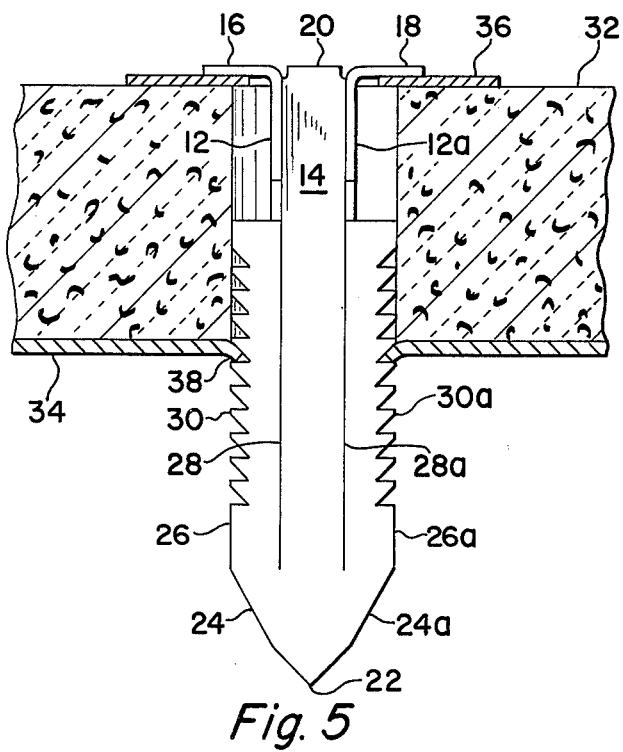
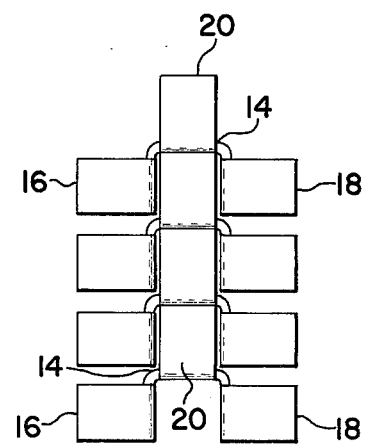

SHEET METAL DRIVE FASTENER

The present invention is concerned with a sheet metal fastener particularly adapted for securing pads or sheets of roofing insulation to sheet steel or other sheet metal deck or wall arrangements by passing through the insulation and puncturing the deck for interlocking therewith.

There are many forms of fasteners for receiving materials of various types to panel or deck arrangements, including conventional roofing nails; driven fasteners which automatically lock behind the blind face of a panel; driven fasteners will serrated shank edges for interlocking with the panel and sheet material, and such fasteners with spring arms to lock behind the panel; driven fasteners with arcuate shanks and pointed ends for piercing sheet metal decking with spring tabs for locking behind the decking, and other types.

In accordance with the present invention, an object is to provide a fastener of the general type mentioned above with a pointed somewhat arcuate shank and serrated wings trailing and diverging therefrom such that a generally arcuate aperture formed in the decking will force the wings inwardly under compression as the fastener is driven to its securing position.

Another object of the invention is to provide a fastener of the above type wherein the wings are positioned relative to the shank for compressive movement by the decking aperture against differential resistances, one a strong resistance toward contact with the shank edges and the other a lesser resistance tending to follow the curvature of the decking aperture.

A further object of the invention is to provide a fastener of the above type wherein the wings are stressed to exert maximum force in the planes thereof outwardly into engagement with the decking surface and to exert a lesser force urging the same toward or away from the center of apical axis of the decking aperture.

A still further object of the invention is to provide a fastener substantially of the above type which is adapted for collating in a magazine feed for automatic driving and with a head formed of separate lugs extending laterally of the shank from separate axes to guard against total failure of the fastener upon exertion of force in a single dirction.

The above and other objects of the invention will in part be obvious and will be hereinafter more fully pointed out in the detail description of the drawing wherein, FIG. 1 is a front elevation of the fastener;

FIG. 2 is a side elevation of the fastener;

FIG. 3 is a bottom plan view of the fastener as shown in FIG. 1;

FIG. 4 is a sectional view along the line 4—4 of FIG. 1, and showing the direction A of strong resistance to compressing the wings and direction B of lesser resistance to compressing the wings;

FIG. 5 is a side view of the fastener driven to securing position in the deck and insulation assembly which is shown in section; and FIG. 6 is a top view showing the manner of collating the fasteners for magazine feed in an automatic driver.

With reference to the accompanying drawing, and FIGS. 1 through 4 at this time, the central shank portion 10 of the fastener is illustrated as being arcuate in cross section, which enhances the column strength thereof. The driving end of the fastener shank includes a channel formation with substantially parallel side walls 12, 12a and a joining wall 14. Lugs 16, 18, 20 extend laterally from the walls 12, 12a, 14, respectively, to form the fastener head to be driven. These head portions may be positioned subjacent one another with the remaining shank portions nested to collate the same for driving tool magazine assembly as shown in FIG. 6.

The opposite end of the shank portion 10 continues its arcuate cross section to a pointed end portion 22 which includes integral side portions 24, 24a generally forming continuations of the arcuate pointed end portion. From these side portions, wings 26, 26a extend toward the opposite end of the shank in outwardly divergent relation to the adjacent edges 28, 28a of the shank portion and to the imaginary axis of curvature of the arcuate shank. The free ends of the wings 26, 26a terminate adjacent the channel forming walls 12, 12a, respectively, and the outer edges of the wings are provided with multiple serrations 30, 30a, each with a downwardly and inwardly inclined lower edge and an upper generally horizontal edge forming a shoulder.

The fastener is shown applied to a roof structure in FIG. 5 with the insulation sheet 32 supported on a steel deck 34. The opposite face of the insulation material may also include a suitable covering sheet or merely the apertured fragmentary sheet 36 against which the head lugs abut with the fastener in secured position compressing the insulation sheet. As this fastener is driven through the roofing assembly, initial contact of the pointed end 22 of the fastener with the decking steel 34 or other sheet material will penetrate the same and progressively result in the formation of an arcuate slot or aperture through the decking. This arcuate slot will follow the arcuate contour of the pointed end portion 22 and the side portions 24, 24a thereof. With the decking slot thus formed, continued driven movement of the fastener will result in the wings 26, 26a being urged inwardly by the edges of the decking slot with a somewhat compound movement to reach the driven home position of the fastener as shown in FIG. 5. Thus, the wings will be forced inwardly in the directions A of FIG. 4 substantially in the planes thereof toward and ultimately in contact with the inner edges thereof in contact with, or closely adjacent the edges 28, 28a of the shank portion 10. At the same time, the wings may be urged in the directions B of FIG. 4, that is toward or away from the imaginary or apical axis of curvature of the shank portion as they follow the curvature of the edges of the decking slot. Movement of the wings in the directions A will be against maximum resistance because of the bodily planar movement of the wings toward the shank edges, while movement of the wings in the directions B will be against lesser resistance as it involves some bending of the wings at the junctures with the side portions 24, 24a as well as along the lengths thereof. In the installed position of the fastener in the decking assembly, therefore, the wings or arms 26, 26a will be compressed to generally follow the arcuate cross sectional configuration of the shank and the maximum outward force exerted by the wings will be opposite to the directions A. This will effect maximum holding power of the wings against the edges of the decking slot with the shoulders of the serrations beneath the decking held firmly in that position for engagement therewith and underlying any deflected portions 38 of the decking which may be formed as an incident to passage of the fastener therethrough. At the same time, the wings tend to be compressed with a lesser force toward or away from the center axis of the shank, thus tending to wedge the same along the decking slot for further insurance holding power. In the installed position of the fastener, the free ends of the wings will underlie the upwardly inclined adjacent edges 15, 15a of the channel walls 12, 12a, respectively. While illustrated in connection with a roofing assembly with steel decking, the fastener may be employed with other insulated panel arrangements as those with insulation between two metal panels; and as floor or dash arrangements in automotive vehicles and the like; and the sheet segment 36 may be employed as a seal in any such arrangements. As illustrated, the fastener is a onepiece element formed from a sheet metal stamping or gauge and strength characteristics dictated by the installation of use.

The lugs 16, 18 and 20 extend in a cantilever fashion from the upper extremity of the fastener shank. Each lug will, therefore, have a distinct and different bending axis from the other thus protecting against complete failure of the head under forces tending to peel the headfrom the roof structure.

I claim:

1. A one-piece fastener for piercing a sheet metal panel or the like and securing thereto an insulation sheet or the like; and comprising an arcuate shank portion with head means at one end thereof and with a piercing point portion having a substantially arcuate cross section located at the opposite end thereof; and a pair of planar wings diverging outwardly from the associated longitudinal side edges of the shank portion spacing the inner edges of the wings from the adjacent side edges of the shank portion for maximum resistance to movement of the wings in the planes thereof toward the adjacent edges of the shank portion when the fastener is driven to securing position, said wings diverging from the point portion toward and terminating short of the head means and having serrations along the outer edges thereof providing shoulders for locking engagement with a panel after-piercing thereof by the point portion, said wings lying generally in planes which include the side edges of the shank and said planes being generally tangent to the imaginary surface of revolution which includes the arcuate shank, said penetrating point adapted to form an arcuate slot which tends to force the wings inwardly toward the side edges of the shank and generally wedge in the arcuate configuration of the slot when the fastener is driven to securing position.

2. A fastener as claimed in claim 1, wherein the wings diverge from the center axis of the arcuate shank portion to positions from which the wings will be moved to attempt to follow the contour of the arcuate shank portion with the inner edges moving toward the adjacent edges of the shank portion against strong resistance while approaching the center axis of the shank portion and against lesser resistance in a direction generally radially of the imaginary axis of the arcuate contour.

3. A fastener as claimed in claim 1, wherein the head means comprises spaced lugs extending laterally of the shank portion.

4. A fastener as claimed in claim 3, wherein the shank portion includes a channel formation beginning adjacent the free ends of the wings, said channel formation comprising a pair of side walls and the included shank wall and from which walls the lugs respectively extend.

5. A plurality of collated fasteners of the type described in claim 3, wherein the lugs extending from the shank walls of one fastener extend into and are received by the channel of the adjacent fastener.

* * * * *